United States Patent [19]

Fonfria et al.

[11] Patent Number: 4,696,082
[45] Date of Patent: Sep. 29, 1987

[54] METHOD FOR MANUFACTURING ELECTROLYTIC CAPACITORS AND CAPACITORS THUS OBTAINED

[75] Inventors: Robert Fonfria, Dijon; Marie P. Risbet, Ste. Suzanne; Jean L. Zattara, Dijon, all of France

[73] Assignee: Compagnie Europeenne de Composants Electroniques LCC, Courbevoie, France

[21] Appl. No.: 871,791

[22] Filed: Jun. 9, 1986

[30] Foreign Application Priority Data

Jun. 11, 1985 [FR] France ............................... 8508809

[51] Int. Cl.⁴ ............................................. H01G 9/00
[52] U.S. Cl. .................................... 29/25.42; 361/433
[58] Field of Search ............... 29/25.42, 570; 361/304, 361/305, 323, 433 C, 433 W, 433 S, 321 C, 306, 308, 309, 310

[56] References Cited

U.S. PATENT DOCUMENTS

| | | | |
|---|---|---|---|
| 3,071,842 | 1/1963 | Helda et al. | 29/25.42 |
| 3,320,484 | 5/1967 | Riley et al. | 361/433 C X |
| 3,506,895 | 4/1970 | Kellerman | 29/25.42 X |
| 3,789,274 | 1/1974 | Pfister et al. | 361/433 S |
| 4,146,916 | 3/1979 | Breeden et al. | 361/433 S |
| 4,158,218 | 6/1979 | McLaurin et al. | 361/321 C X |
| 4,180,161 | 12/1979 | Henrickson et al. | 361/321 C X |
| 4,226,011 | 10/1980 | Hunt | 361/309 X |
| 4,578,737 | 3/1986 | Westermann | 361/308 |

FOREIGN PATENT DOCUMENTS

| | | |
|---|---|---|
| 0130001 | 1/1985 | European Pat. Off. . |
| 0130386 | 2/1985 | European Pat. Off. . |
| 2011553 | 3/1970 | France . |
| 36751 | 3/1977 | Japan ................................. 29/25.42 |
| 836392 | 6/1960 | United Kingdom . |

OTHER PUBLICATIONS

25th Electronic Components Conference, Washington, D.C., 12-14, May 1975, pp. 110-114; H. F. Puppolo, et al.: "Stacked-foil Capacitro Packaging Improvements and Technology".

Primary Examiner—Donald A. Griffin
Attorney, Agent, or Firm—Oblon, Fisher, Spivak, McClelland & Maier

[57] ABSTRACT

The invention concerns the manufacture of electrolytic capacitors mainly in the form of chips or components which are transferable when lying flat, wherein the manufacturing method comprises the following steps:
  obtaining a capacitive strip through spool on a large-diameter wheel;
  schooping the lateral faces of the strip;
  removing the strip;
  delimiting the capacitive blocks through cutting out;
  impregnating by an electrolyte;
  putting in place of capacitive blocks on connecting means;
  coating the blocks;
  forming and crimping the electrodes.

8 Claims, 7 Drawing Figures

METHOD FOR MANUFACTURING ELECTROLYTIC CAPACITORS AND CAPACITORS THUS OBTAINED

BACKGROUND OF THE INVENTION

1. Field of the Invention

The present invention concerns the manufacture of electrolytic capacitors and, more particularly, the manufacture of electrolytic capacitors in the form of components which are transferable when lying flat on a substrate entering within the general design of an electronic assembly. These components are generally known as "chips".

2. Description of the Prior Art

Different types of electrolytic capacitors are already known. The internal structure of such a component is variable, according to the nature of the filmogenous metal utilized. Therefore, it may concern a specific geometrically defined porous mass when the metal employed is tantalum or niobium. On the other hand, when the metal is relatively poorly adapted to obtaining a porous mass, the capacitive element is then produced in the form of a surface, possibly etched, appropriately oxidized and wound upon itself. Complementary elements such as cathode and electrolyte support, are also incorporated within the element.

Methods for manufacturing these windings are well known. They produce capacitive elements that are relatively poorly adapted to obtaining "chip" type components. This is due to reasons concerning the cylindrical geometry of the capacitive elements and the more or less liquid nature of the electrolyte used.

In order to overcome these drawbacks, the present invention proposes an electrolytic capacitor in the form of a sandwich structure and allowing to obtain a chip. This capacitor can be obtained through a production method that is well adapted to large-scale manufacture at low cost and which comprises the winding of anodic foils, electrolyte and cathodic support on a large-diameter wheel.

SUMMARY OF THE INVENTION

The object of the invention is thus a method for manufacturing electrolytic capacitors, wherein the method comprises at least the following steps:

a. obtaining at least one capacitive strip through winding on a wheel of an anodic foil, a cathodic foil and an electrolyte support;

b. shooping of the lateral faces of the strip so as to carry out anodic and cathodic armatures;

c. removing the capacitive strip from the wheel;

d. delimiting the capacitive blocks by notches or recesses provided in the strip;

e. impregnating the said support by an electrolyte;

f. putting in place the capacitive blocks on connecting means intended to form the electrodes of the capacitors;

g. coating the blocks with a protective material so as to allow parts of the connecting means to protrude;

h. form shaping the said parts so as to constitute the electrodes of the capacitors.

The method allows to advantageously obtain capacitors in the form of chips by carrying out the coating of each capacitive block in the form of a parallelepiped and by folding over the electrodes upon the two opposite faces of the parallelepiped.

Another object of the invention is the capacitors obtained by this manufacturing method.

BRIEF DESCRIPTION OF THE DRAWING

The present invention will become more apparent and other features, objects and advantages will appear from the following description, given with reference to the appended drawing in which.

DESCRIPTION OF THE PREFERRED EMBODIMENTS

Figure 1:
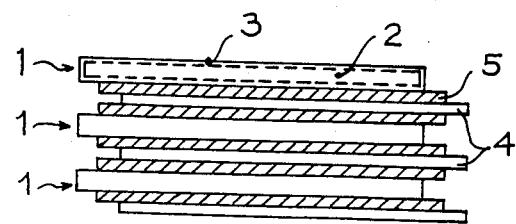
FIGS. 1 and 2 are views of a stacking or pile constituting a capacitive strip.

The manufacture of stacked capacitors from plastic dielectric is known. This manufacture consists in winding on a large-diameter wheel metallized plastic dielectric films according to a determined number of turns. The capacitive strip thus obtained constitutes a mother capacitor. Therafter, for one wheel rotation, an intercalating inset is wound that is wider than the plastic films. It is possible to superimpose a certain number of capacitive strips which number is only limited by the risks of causing the stacking to collapse. Shooping and cutting out operations are thereafter performed until a parallelepiped is obtained which, after molding, will constitute the chip. The shooping operation consists in obtaining, through metal projection, a mechanical connection and an electrical contact between the metallized foils constituting the electrodes of the capacitors.

The invention proposes adapting and improving this method in order to produce stacked metallized foil electrolytic capacitors. More generally, the method proceeds by simultaneously winding, on a large-diameter wheel, of an anodic foil, an electrolyte support and a cathodic foil. Each rotation turn of the wheel determines the creation of an elementary sandwich. The consecutive winding of n elementary sandwiches allows to obtain a capacitive strip having a value corresponding to the mounting in parallel of these n layers. This winding is then interrupted in order to place an intercalating inset intended to separate the first capacitive strip from the next. This operation will be repeated so as to achieve a stacking of strips whose number will be limited by the height beyond which there is risk of collapse of the stacking assembly. This assembly will be covered on its lateral faces with a conductive material compatible with the electrochemical requirements of the capacitor. There is a putting in parallel of the armatures of the same sign within the capacitive strip. These strips are therafter severed in order to interrupt the circumference, separated from one another and capacitive strips having a length of from 1 to 3 meters are obtained. The following phase consists in severing the strips perpendicularly with respect to their longitudinal axis so as to obtain blocks the electric capacity of which will depend upon the basic characteristics of the anodic foil, upon the number of elementary sandwiches put in parallel as well as the length separating the notches.

The cutting out of the strips into blocks practically provokes degradations of the anodic parts thus exposed. These degradations consist in a partial disappearance of the dielectric layer that covers the anodic foil. It is therefore necessary to proceed with an anodic oxidation operation in order to reconstitute the dielectric layer. This reconstitution operation is carried out from an electrolyte bath. It is preferable to utilize an electrolyte which, once the reconstitution operation has been completed, can easily can eliminated through drying. The following operation consists in impregnating the electrolyte supports contained in the block by an electrolyte intended to remain in the capacitor.

The blocks thus prepared will receive connecting conductor elements. It is advantageous to place these blocks in connecting elements that have two purposes: to furnish weldable metallic tags or tongues for rendering the chips functional and to ensure the intermediary role of the joint plan during the injection or transfer molding operations when it is desired to mold the exposed block.

The different operations mentioned herein-above will be described in detail herein-above within the framework of the embodiment, given by way of non-limitative example, of aluminium electrolytic capacitors. This embodiment can be adapted to several alternatives of the invention, certain of which will be described herein-below in further detail.

The anodic foil can be constituted by an etched and oxidized aluminum foil. The anodic oxidation voltage can be about 35V. For example, the width of the anodic foil will be 4.5 mm and its thickness 90 $\mu$m. The cathodic foil can be easily etched, have the same width and a thickness of 30 $\mu$m. Such foils are widely commercially available. The electrolyte support will be selected from among a certain number of materials. Its selection is determined by the nature of the electrolyte utilized, by the value of the series resistance and by the desired voltage behavior. To these considerations relating to the internal structure of the capacitor, must be added those of a mechanical nature encountered during the winding operations. Among the material adapted to be utilized can be cited the following: paper, porous or microporous plastic materials based on polypropylene, polybutylene, polyethylene as well as their derivatives. It is also possible to utilize fine cross-linked structures of polytetrafluoroethylene or glass fibers, etc.

These three foils are for example wound simultaneously on a wide-diameter wheel (from 80 to 100 cm). The winding is carried out so that the anodic and cathodic foils are superimposed upon one another with a slight lateral shift between them and that they are separated from one another by the electrolyte support. FIG. 1 is a cross-sectional view showing the manner of stacking the different foils and the electrolyte support. The anodic foil 1 is represented with its purely metallic part 2 in aluminum and the dielectric layer 3 constituted by $Al_2O_3$ oxide. The cathodic foil 4 is shifted with respect to the anodic foil by about 0.1 to 0.3 mm. The electrolyte support 5 is advantageously disposed so as to slightly overlap on one side of the anodic foil and on the opposite side of the cathodic foil. This allows an improved electric insulation between the anode and the cathode.

Figure 2:
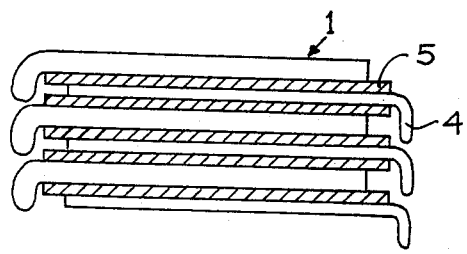

It can be advantageous to fold over the external edges of the anodic and cathodic foils at an angle close to 90° such as represented in FIG. 2. In this FIGURE, it can be seen that the anodic foils are folded over on the side where they overlap the stacking, in the same way as the cathodic foils. These overlappings can be carried out through rollers placed perpendicularly to the anodic and cathodic foils. This overlapping presents an interest during the schooping operations as it allows to ensure an improved mechanical and electrical connection between the anodic foils, on the one hand, and the cathodic foils, on the other hand.

Figure 3:
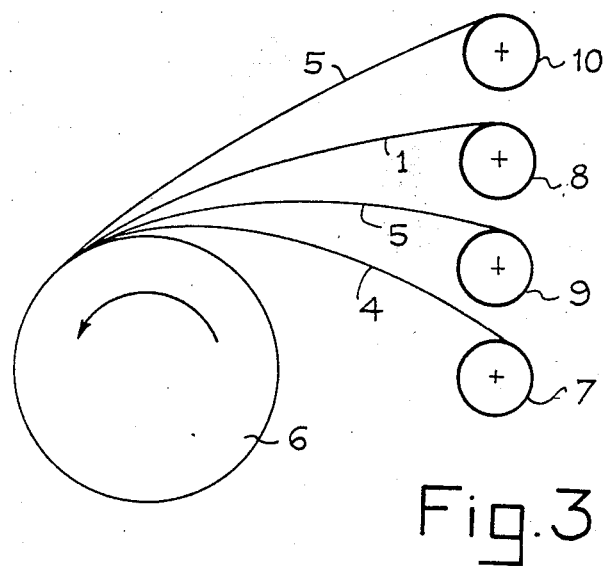
FIG. 3 is an explanatory diagram of a method for manufacturing a capacitive strip through winding.

When the wheel has completed one rotation, an elementary capacitive sandwich is obtained. It is sufficient to realize several rotations of the wheel in order to obtain a stacking of n elementary sandwiches that will subsequently be assembled in parallel in order to form a capacitive strip. FIG. 3 illustrates the method for proceeding with the winding. The rotation of the wheel 6 allows to obtain the stacking of elementary sandwiches from four windings. It is necessary to dispose of at least four spools: one spool 7 for the cathodic foil, one spool 8 for the anodic foil and two spools 9 and 10 for the electrolyte support. In fact, it is necessary to dispose of two spools 9 and 10, otherwise after one rotation of the wheel, the anodic and cathodic foils could contact one another. The following stackings are thus produced: cathodic foil—electrolyte support—anodic foil—electrolyte support—cathodic foil—etc.

Once the stacking of n elementary sandwiches has been completed, i.e. the capacitive strip, an intercalating inset is wound upon one rotation of the wheel. It is necessary that the nature of the intercalated inset be such that it ensures poor adherence between said inset and the metal utilized for the shooping. In the case of anodic and cathodic foils made of aluminum, the shooping can be carried out by projecting aluminum. The intercalated insets will thus advantageously be made of steel. An intercalated inset width of 6 to 7 mm is satisfactory in the case where the width of the foils is 4.5 mm.

The spool operation of the capacitive strips is carried out according to the same method, the number of superimposed strips only being limited by the risks of collapse of the stacking. In the example described, it is possible to obtain the stacking of 25 strips which represents a thickness of 40 mm. The stacking is then encircled by means of a controlled tightening device, in order to compact the whole.

According to the nature of the electrolyte support utilized, it can be of interest to carry out, at this stage of manufacturing, a heat treatment favorizing the soldering or gluing of the different layers of the electrolyte support onto the anodic or cathodic foils. This operation confers improved rigidity upon the assembly. This heat treatment can be carried out a temperature comprised between 125° and 140° C. during up to 8 hours.

The following step consists in connecting together the different foils having the same polarity. In order to do this, pure aluminum will be preferably utilized which will be deposited by shooping. The shooping can be carried out alternately on one face and thereafter the other, but it is preferable to perform it symmetrically and simultaneously so as to reduce risks of deforming the capacitive strip. This solution also allows to reduce operating costs.

The different capacitive strips are thereafter separated from the support wheel by severing at one or two points of the circumference according to the thickness of each of the strips. According to the case, the lengths of the strips can vary from between 1 to 3 meters. Once they have been removed from the wheel, their shape corresponds to a wide-radius arc. It is thereafter necessary to proceed with the cutting out of the strips at determined intervals in order to obtain capacitive blocks.

Various cutting out methods can be utilized. It is possible to utilize sawing, milling, grinding at more or less high speed with or without lubricant techniques. Moreover, it is possible to utilize a laser cutting technique or high-pressure liquid jet cutting technique. This latter technique can be utilized as the liquid the electrolyte of which use will be made in the following stage. Whatever the technique used, the cutting out provokes the degradation of the anodic foils at the place where they are severed. This degradation consists in the local disappearance of the dielectric of the anode. The surfaces affected by this degradation are not very large but it is necessary to restore them.

Figure 4:
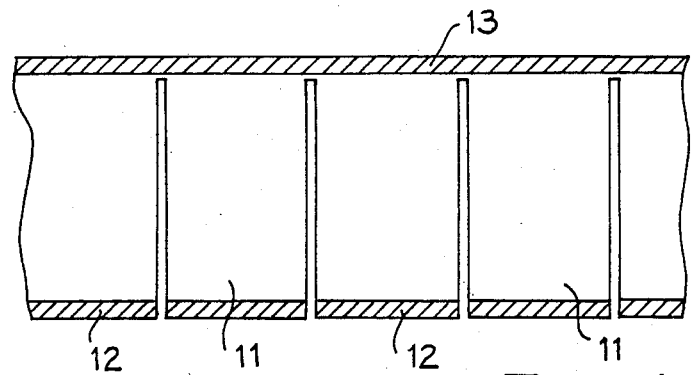
FIG. 4 is a view from above of a partially severed capacitive strip.

The cutting out in itself can be carried out in two different ways. According to a first alternative of the invention, the capacitive strips will be severed at the determined interval but the cut will be incomplete so as not to affect the end of the positive armature. FIG. 4 is a partial view from above of the capacitive strip cut in this way. A sort of comb is thus obtained the teeth of which are constituted by blocks 11 with their negative armature 12. The blocks will thus be retained by the positive armature 13 which remains continuous.

Figure 5:
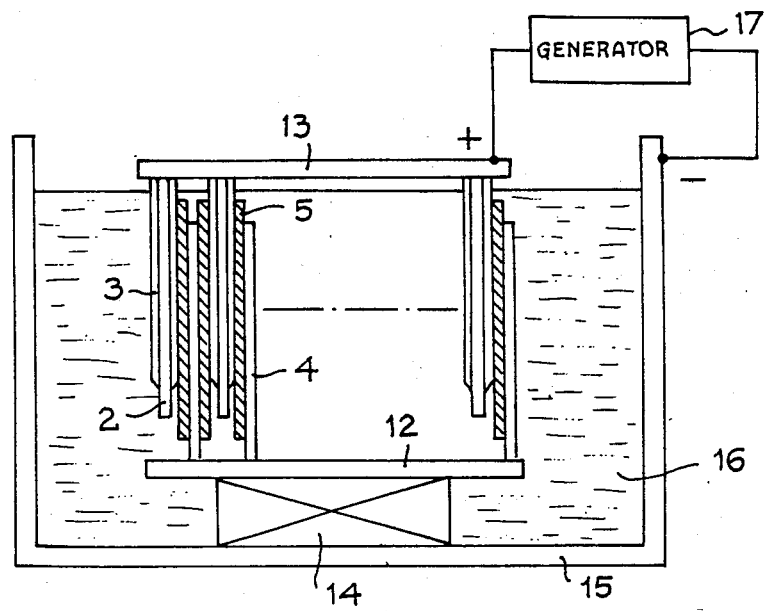
FIG. 5 illustrates an operation for restoring the anode dielectric.

Restoring the dielectric can be carried out by electrolysis, through immerging the capacitive strip in an electrolytic bath while maintaining the positive armature out of the bath. The electrolytic bath is for example constituted by an aqueous solution of boric acid at 7%. The direct current applied will be about 0.4 mA per $cm^2$ of anodic surface, up to the obtention of a voltage equivalent to the oxidation voltage of the anodic foil (35V in the selected example). The duration of the operation is short and does not exceed a few minutes. FIG. 5 describes the operation for restoring the dielectric. The capacitive strip is seen according to one of its severed ends. The destroyed parts of the dielectric 3 have been represented. Its severed negative armature 12 is placed on a porous insulating support 14 resting on the bottom of a tank 15 made of electrically conductive material. The level of the electrolytic bath 16 is such that it does not reach the positive armature 13. The direct current generator 17 allowing the electrolysis is connected between the positive armature 13 and the tank 15.

Thereafter, elimination of the electrolyte is carried out by washing and drying. The severed comb-shaped strip is thus ready to receive its final electrolyte.

According to a second alternative of the invention, the capacitive strips are completely severed. The capacitive blocks are assembled in work units by transfer into an electrolysis tank. They are placed as before on a porous insulating support and their positive electrodes emerge from the electrolytic bath. The blocks are disposed so that the positive armatures can be easily connected to the voltage generator. For example, the blocks are aligned and a contact bar is placed on the positive armatures. The anodic oxidation operations can be carried out as previously described.

It is thereafter necessary to carry out impregnation of the electrolyte supports. Several electrolytes can be utilized, for example manganese dioxide $MnO_2$ or solid organic electrolytes. According to the choice made, the method of this operation can differ widely.

It is known that the thermal decomposition of a manganese nitrate solution produces $MnO_2$ oxide. It is therefore sufficient to impregnate the electrolyte supports contained in each of the blocks in order to thereafter proceed with the controlled pyrolysis of manganese nitrate and obtain manganese dioxide. It is therefore advantageous to select as electrolyte support a tetrafluoroethylene grid more commonly known under the trademark TEFLON ® or a grid in glass cloth. The impregnation will be carried out by absorption after possible passage under vacuum. The pyrolysis must be controlled with accuracy so as to avoid to a maximum the corrosion of the dielectric layers by nitrogen oxides issuing from the pyrolysis. It is also known that several pyrolysis operations are required in order to obtain a sufficiently thick oxide layer. The slight corrosion suffered by the dielectric layer can be repaired through standard restoring methods. These operations can indifferently be applied to partially or totally severed strips.

Impregnation can also be carried out by a solid organic electrolyte (electro-active polymer). It exists a certain number of organic semiconductors adapted to advantageously replace the manganese dioxide. The most well-known of these products are the 7-7-8-8 tetracyanoquinodimethane complex salts more simply known under the term TCNQ. The pyropyroles can also be utilized as well as tetrathiofulvalene (TTF). The utilization of these products is made from solutions in appropriate solvents, crystalline suspensions or of the molten product. The interest of these products is to contribute to a considerable improvement in behavior at high frequencies, as well as to a low level of current leakages. Impregnation is carried out according to a technology adapted to the selected product. It is in any case much simpler to apply than that relating to manganese dioxide. After the impregnation operation, the severing of the strips is, where necessary, continued in order to obtain individual blocks.

The following operations will consist in the shape forming of the blocks in order to obtain components which are transferable when lying flat.

The blocks are in the form of parallelepipeds and have to receive connections in the form of flat tongues or tags. It must be possible to solder these tags. A protection of the blocks is also necessary and this protection must take into account the thermal stresses generated during soldering of the components obtained on a substrate.

Figure 6:
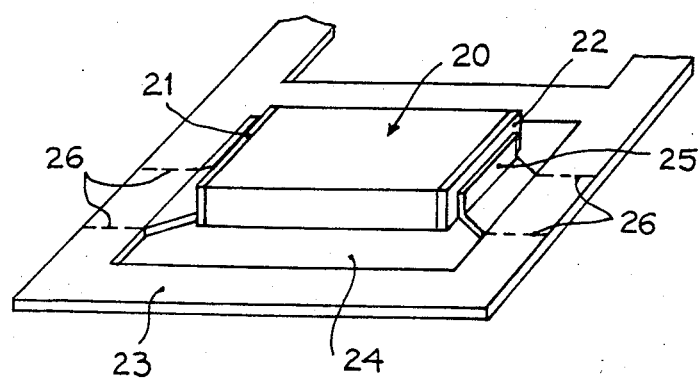
FIG. 6 shows a capacitive block mounted on its connecting device.

The blocks can be automatically transferred onto a connecting device which has a double purpose: to supply the tags necessary for the connection and to ensure the joint plane function when molding the block. The molding can be carried out either by means of resin injected under pressure, or by means of resins than can be utilized by the transfert molding method, or by casting. FIG. 6 is an example of a connecting device that can be utilized. This connecting device is constituted by a foil 23 made of a material that can be soldered on the anodic schoopings 21 and the cathodic schoopings 22 of the capacitive blocks 20. H-shaped punchings 24 are made in foil 23 so as to constitute tongues or tags 25 that are vertically folded over in order to maintain the blocks by a slight spring-effect and to ensure the electrical contact with the shoopings. The soldering of the tags on the schoopings can be carried out through different techniques.

Figure 7:
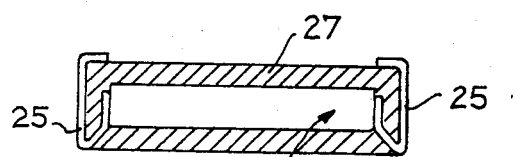
FIG. 7 is a cross-sectional view of the finally obtained component.

After the molding operation consisting in coating each block with resin, foil 23 is cut out according to the dotted lines 26 and tags 25 are folded over and tightened round the coating 27 as shown in FIG. 7.

It is advantageous to foresee on each tag 25 bosses provided so as to maintain the capacitive blocks 20 according to considerably reduced surfaces. This will have the advantage of ensuring correct mechanical securing of the blocks. In order to allow the capacitive element to preserve its properties, it is necessary that it can withstand, without undergoing any damage, the thermal stresses of the flat or direct transfer. A reduction of section of the attachment tags allows to create a thermal resistance between the shooped faces and the future electrodes. The section constriction will preferably be carried out over a short length in order not to over increase the series resistance of the connection and consequently the losses of the capacitor. The constricted section can be obtained by holes provided in the attachment tags.

The connecting device example represented in FIG. 6 is not the only possible example. Other configurations are possible. The punchings provided in foil 23 can have a form different to that represented. The capacitive blocks can be lying flat or edgewise. In particular, foldings can be provided so as to support in a stable manner the blocks prior to soldering. According to the form conferred upon the punching, the external electrodes of the coated component can be located in planes perpendicular to the schooped faces.

Within the framework of an automatized manufacture, the connecting foil will be present in the form of a strip presenting regularly spaced recesses or punchings so as to receive the capacitive blocks. The driving of the strip can be obtained through the intermediary of lateral holes and a suitable device according to known techniques.

The final component obtained is thus present in a form that is transferable when lying flat. It remains to mark the anode and cathode electrodes and to carry out the marking of the component. This marking can be performed through laser marking or by any other method.

In the example of application mentioned hereinabove, six wheel turns and a cutting out into blocks according to the following dimensions: thickness, 1.5 mm; width of strip 4.5 mm and length of severing 3.2 mm were made, leading to chips of 18 microfarads capacity and of a nominal working voltage of 25V.

We claim:

1. Method for manufacturing electrolytic capacitors, wherein the method comprises at least the following steps:
    a. obtaining at least one capactive strip by winding on a spool an anodic foil, a cathodic foil and an electrolyte support;
    b. schooping of the lateral faces of the strip so as to carry out anodic and cathodic armatures;
    c. removing the capacitive strip from the wheel;
    d. delimiting capacitive blocks from said capacitive strip by providing notches or recesses in the strip to partially sever the strip but leave intact its anodic armature;
    e. subjecting the capacitive blocks to an anodic oxidation to restore the dielectric of the anodic foils;
    f. impregnating the said electrolyte support by an electrolyte;
    g. putting in place the capacitive blocks on connecting means intended to form the electrodes of the capacitors;
    h. coating the blocks with a protective material so as to allow the parts of the connecting means to protrude;
    i. form shaping the said parts so as to constitute the electrodes of the capacitors.

2. Method according to claim 1, wherein the coating of each block is present in the form of a parallelpiped, the electrodes being folded over on two opposite faces of the parallelpiped so that the capacitor obtained is present in the form of a chip.

3. Embodiment according to claim 1, wherein the spool of step a.—is followed by an encircling ensuring the controlled tightening of the said anodic and cathodic foils and of the electrolyte support.

4. Manufacturing method, according to claim 1, wherein, prior to step b.—the strip is submitted to a thermal treatment causing the electrolyte support on the anodic and cathodic foils to be soldered or glued.

5. Manufacturing method according to claim 1, wherein the impregnation electrolyte is manganese dioxide.

6. Manufacturing method according to claim 1, wherein the impregnation electrolyte is a solid organic material.

7. Manufacturing method according to claim 1, wherein the anodic and cathodic foils are made of aluminum.

8. Manufacturing method according to claim 7, wherein the anodic foil is etched and oxidized.

* * * * *